US011458922B2

(12) United States Patent
Fischer et al.

(10) Patent No.: US 11,458,922 B2
(45) Date of Patent: Oct. 4, 2022

(54) FLOOR-MOUNTED OCCUPANT RESTRAINT SYSTEM

(71) Applicant: TRW VEHICLE SAFETY SYSTEMS INC, Washington, MI (US)

(72) Inventors: Kurt F. Fischer, Rochester, MI (US); Angelo J. Adler, Shelby Township, MI (US); Alexandra E. Schroeder, Lenox, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/971,314

(22) PCT Filed: Feb. 27, 2019

(86) PCT No.: PCT/US2019/019699
§ 371 (c)(1),
(2) Date: Aug. 20, 2020

(87) PCT Pub. No.: WO2019/168883
PCT Pub. Date: Sep. 6, 2019

(65) Prior Publication Data
US 2021/0078517 A1    Mar. 18, 2021

Related U.S. Application Data

(60) Provisional application No. 62/726,493, filed on Sep. 4, 2018, provisional application No. 62/636,899, filed on Mar. 1, 2018.

(51) Int. Cl.
*B60R 21/206*    (2011.01)
*B60R 21/015*    (2006.01)
(Continued)

(52) U.S. Cl.
CPC .......... *B60R 21/206* (2013.01); *B60R 21/013* (2013.01); *B60R 21/01516* (2014.10);
(Continued)

(58) Field of Classification Search
CPC ............ B60R 21/01516; B60R 21/206; B60R 21/2338; B60R 2021/0009;
(Continued)

(56) References Cited

U.S. PATENT DOCUMENTS 4,765,569 A * 8/1988 Higgins .................. B60R 21/16
                                                    244/118.5
6,113,134 A * 9/2000 Lim ........................ B60R 21/26
                                                    280/730.1
(Continued)

FOREIGN PATENT DOCUMENTS

JP         10310011 A * 11/1998 ............. B60N 3/066
JP      2004196026 A *  7/2004 ........... B60R 21/206
(Continued)

*Primary Examiner* — Laura Freedman
(74) *Attorney, Agent, or Firm* — Tarolli, Sundheim, Covell & Tummino LLP

(57) ABSTRACT

A restraint system for helping to protect an occupant of a vehicle having a floor and a cabin with a floor for the occupant includes an airbag. The airbag has a stored condition on the vehicle floor and is inflatable to a deployed condition aligned with the occupant in a forward-rearward direction of the vehicle. The airbag is configured to utilize the vehicle floor as a reaction surface for restraining the movement of the airbag in response to occupant penetration into the airbag.

21 Claims, 9 Drawing Sheets

(51) Int. Cl.
  *B60R 21/013* (2006.01)
  *B60R 21/2338* (2011.01)
  *B60N 2/14* (2006.01)
  *B60R 21/00* (2006.01)
  *B60R 21/231* (2011.01)

(52) U.S. Cl.
  CPC .......... *B60R 21/2338* (2013.01); *B60N 2/143* (2013.01); *B60R 2021/0009* (2013.01); *B60R 2021/23153* (2013.01); *B60R 2021/23388* (2013.01)

(58) Field of Classification Search
  CPC .... B60R 2021/0023; B60R 2021/0046; B60R 2021/23107; B60R 2021/23153; B60R 2021/23386; B60R 2021/23388; B60R 21/013; B60N 2/143
  See application file for complete search history.

(56) References Cited

U.S. PATENT DOCUMENTS

| | | | | |
|---|---|---|---|---|
| 6,189,928 | B1* | 2/2001 | Sommer | B60R 21/233 280/731 |
| 6,217,059 | B1* | 4/2001 | Brown | B60R 21/16 280/730.1 |
| 6,254,130 | B1* | 7/2001 | Jayaraman | B60R 21/233 280/731 |
| 6,315,323 | B1* | 11/2001 | Pack, Jr. | B60R 21/233 280/735 |
| 6,343,810 | B1 | 2/2002 | Breed | |
| 6,349,965 | B1* | 2/2002 | Heilig | B60R 21/02 280/748 |
| 7,090,245 | B2* | 8/2006 | Yoshikawa | B60R 21/206 280/729 |
| 7,669,897 | B2* | 3/2010 | Sano | B60R 21/045 280/752 |
| 8,360,464 | B2* | 1/2013 | Enders | B60R 21/206 280/730.1 |
| 8,408,584 | B2* | 4/2013 | Paxton | B60R 21/2338 280/728.2 |
| 9,283,916 | B2* | 3/2016 | Nagasawa | B60R 21/231 |
| 9,308,883 | B1* | 4/2016 | Schneider | B60R 21/231 |
| 9,499,118 | B2* | 11/2016 | Jindal | B60R 21/206 |
| 9,744,932 | B1 | 8/2017 | Faruque et al. | |
| 10,023,145 | B1* | 7/2018 | Rivera | B60R 21/0136 |
| 10,525,922 | B1* | 1/2020 | Lin | B60R 21/01516 |
| 10,589,708 | B2* | 3/2020 | Cho | B60R 21/2338 |
| 10,688,955 | B2* | 6/2020 | Shin | B60R 21/232 |
| 11,066,033 | B2* | 7/2021 | Goswami | B60R 22/4619 |
| 11,097,680 | B2* | 8/2021 | Jayakar | B60R 21/2338 |
| 2008/0243342 | A1 | 10/2008 | Breed | |
| 2012/0242070 | A1 | 9/2012 | Paxton et al. | |
| 2016/0244016 | A1 | 8/2016 | Takeshita et al. | |
| 2017/0225570 | A1 | 8/2017 | El Aile et al. | |
| 2020/0130632 | A1* | 4/2020 | Sekizuka | B60R 21/231 |
| 2020/0391691 | A1* | 12/2020 | Fischer | B60R 21/207 |

FOREIGN PATENT DOCUMENTS

| | | | | |
|---|---|---|---|---|
| JP | 2008044594 A | * | 2/2008 | ........ B60R 21/2338 |
| JP | 2020189575 A | * | 11/2020 | |
| KR | 1020090102470 | | 9/2009 | |

* cited by examiner

FLOOR-MOUNTED OCCUPANT RESTRAINT SYSTEM

CROSS REFERENCE TO RELATED APPLICATIONS

This application is a national stage of International Application No. PCT/US2019/019699, filed Feb. 27, 2019, which claims benefit of U.S. Provisional Appln. Nos. 62/636,899, filed Mar. 1, 2018, and 62/726,493, filed Sep. 4, 2018. The disclosures of these applications are incorporated herein by reference in their entireties.

TECHNICAL FIELD

The present invention relates generally to vehicle airbags and, in particular, relates to floor-mounted airbags that rely on the floor for a reaction surface.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system for helping to protect an occupant of a vehicle having a floor and a cabin with a floor for the occupant includes an airbag. The airbag has a stored condition on the vehicle floor and is inflatable to a deployed condition aligned with the occupant in a forward-rearward direction of the vehicle. The airbag is configured to utilize the vehicle floor as a reaction surface for restraining the movement of the airbag in response to occupant penetration into the airbag.

According to another aspect, a restraint system for helping to protect an occupant of a vehicle having a floor and a cabin with a seat for the occupant includes an airbag having a stored condition on the vehicle floor and being inflatable in a lateral direction of the vehicle to a deployed condition in front of the occupant. First and second tethers each have a first end connected to the airbag and a second end connected to the vehicle floor behind the occupant. The first and second tethers are configured to transmit the energy of an occupant penetrating the airbag to the vehicle floor such that the airbag utilizes the vehicle floor as a reaction surface for restraining the movement of the airbag in response to occupant penetration.

According to another aspect, taken alone or in combination with any other aspect, the airbag is positioned in an instrument panel of the vehicle.

According to another aspect, taken alone or in combination with any other aspect, the deployed condition is between the instrument panel and the seat.

According to another aspect, taken alone or in combination with any other aspect, at least one tether has a first end connected to the airbag and a second end connected to the vehicle floor. The at least one tether is configured to transmit the energy of an occupant penetrating the airbag to the vehicle floor.

According to another aspect, taken alone or in combination with any other aspect, first and second tethers each have a first end connected to the airbag and a second end connected to the vehicle floor. The first and second tethers are configured to transmit the energy of an occupant penetrating the airbag to the vehicle floor.

According to another aspect, taken alone or in combination with any other aspect, first and second tether actuation units connect the second ends of the tethers to the vehicle floor. One of the tether actuation units is actuatable in response to detecting an oblique vehicle crash to release one of the first and second tethers and allow the airbag to shift in the lateral direction of the vehicle in response to occupant penetration.

According to another aspect, taken alone or in combination with any other aspect, the first actuation unit and the first tether are positioned on a right side of the seat and wherein the first actuation unit releases the first tether in response to a left-side oblique vehicle crash.

According to another aspect, taken alone or in combination with any other aspect, the second actuation unit and the second tether are positioned on a left side of the seat and wherein the second actuation unit releases the second tether in response to a right-side oblique vehicle crash.

According to another aspect, taken alone or in combination with any other aspect, an oblique crash sensor is connected to the vehicle for providing a signal indicative of an oblique vehicle crash. A controller receives the signal from the oblique crash sensor and is connected to the tether actuation unit for releasing the tether in response to the signal.

According to another aspect, taken alone or in combination with any other aspect, first and second tether actuation units connect the second ends of the tethers to the vehicle floor. One of the tether actuation units is actuatable in response to detecting an out of position occupant to release one of the first and second tethers and allow the airbag to shift in the lateral direction of the vehicle in response to occupant penetration.

According to another aspect, taken alone or in combination with any other aspect, at least one weight sensor is connected to the seat for providing a signal indicative of a position of the occupant in the seat. A controller receives the signal from the at least one weight sensor and is connected to the tether actuation units for releasing one of the first and second tethers in response to the signal.

According to another aspect, taken alone or in combination with any other aspect, the airbag is inflatable in a lateral direction of the vehicle to a position in front of the occupant.

According to another aspect, taken alone or in combination with any other aspect, the airbag includes a first leg connected to the floor, a second leg facing the occupant, and a portion connecting the first and second legs such that the airbag is hook-shaped.

According to another aspect, taken alone or in combination with any other aspect, a housing is configured to be mounted on the vehicle floor and an inflator provides inflation fluid for inflating the airbag.

According to another aspect, taken alone or in combination with any other aspect, a sensor senses the occurrence of an event for which deployment of the airbag is desired and producing a signal indicative thereof. A controller is connected to the sensor and, in response to receiving the signal, actuates an inflator to inflate the airbag to the deployed condition.

Other objects and advantages and a fuller understanding of the invention will be had from the following detailed description and the accompanying drawings.

DETAILED DESCRIPTION

Figure 1:
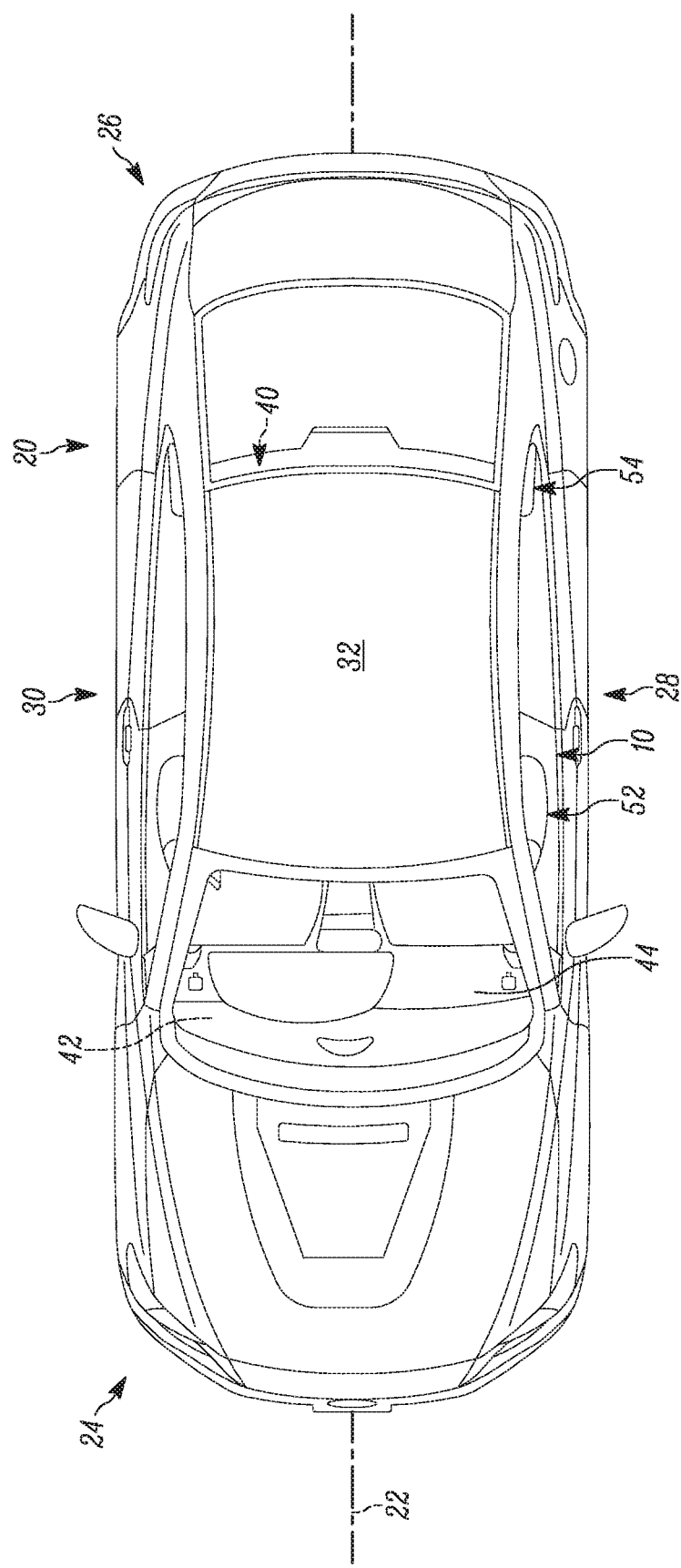
FIG. 1 is a top view of a vehicle including an example floor-mounted, occupant restraint system.
Figure 2:
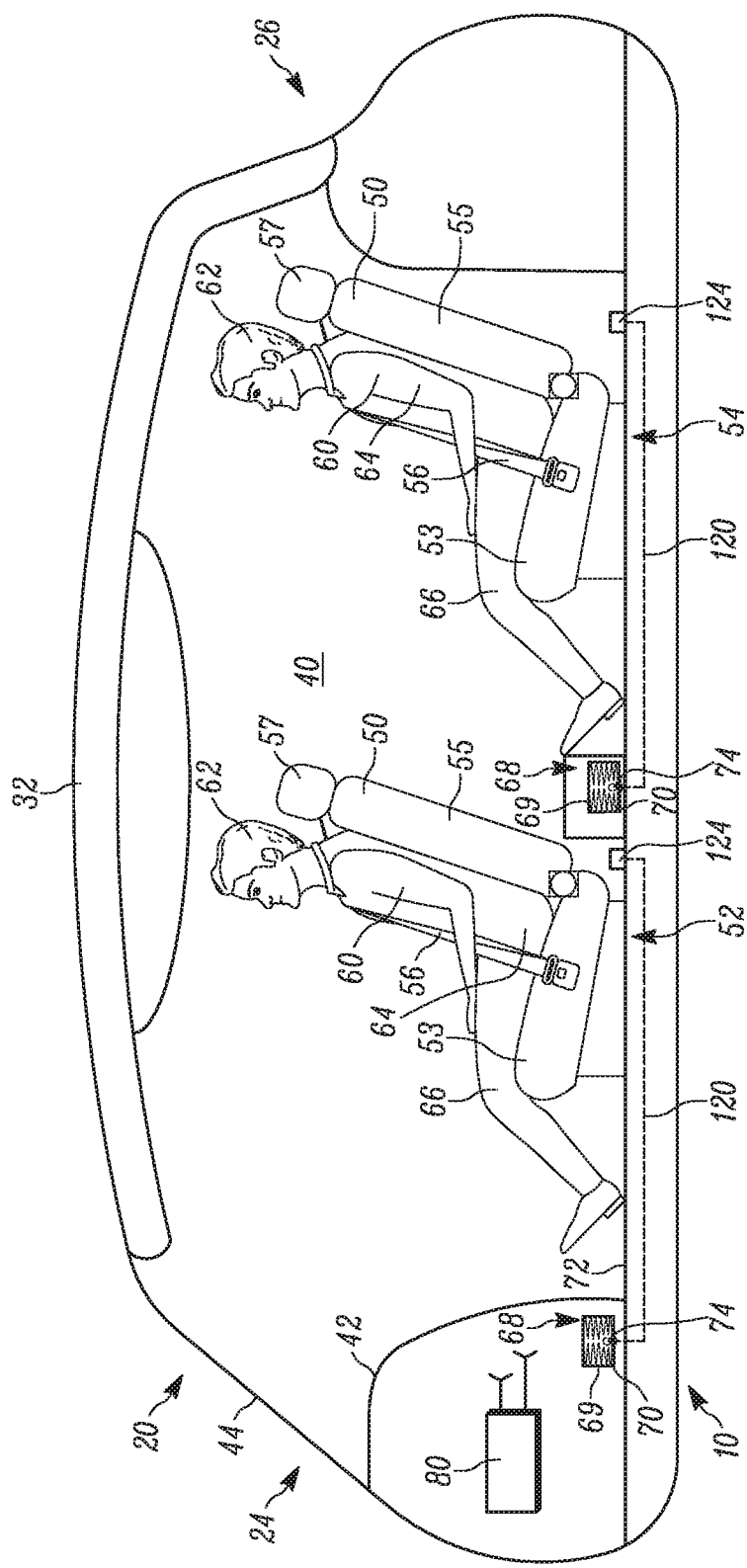
FIG. 2 is a schematic illustration of a cabin of the vehicle with a first seating arrangement and an example airbag of the restraint system in a stored condition.

The present invention relates generally to vehicle airbags and, in particular, relates to floor-mounted airbags that rely on the floor for a reaction surface. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants 60, by instrument panel 42 mounted airbags. In the autonomous vehicle 20 of FIG. 2, however, the instrument panel 42 can be reduced in size and/or removed altogether.

Figure 3:
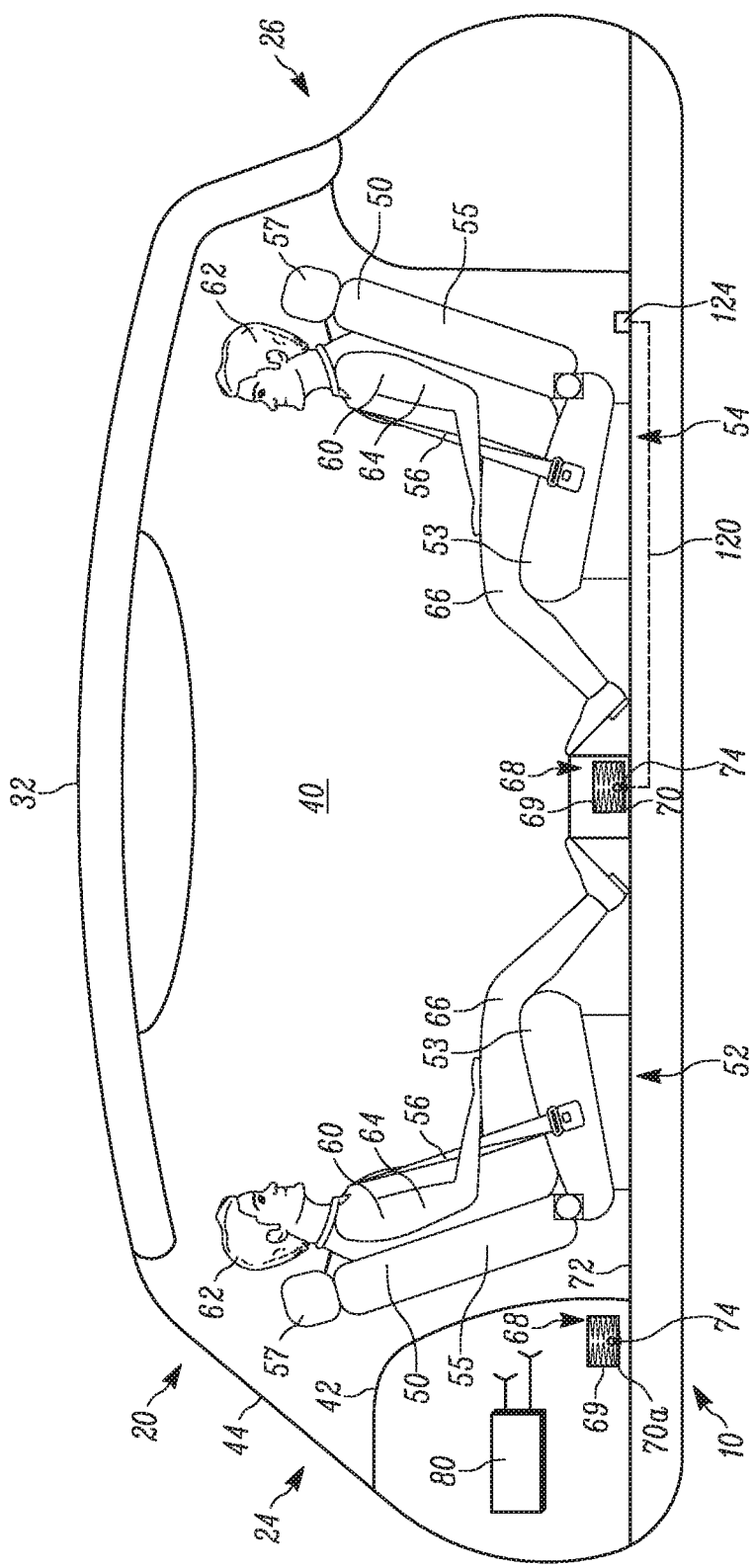
FIG. 3 is a schematic illustration of a cabin of the vehicle with a second seating arrangement and another example airbag of the restraint system in a stored condition.

In another seating arrangement shown in FIG. 3, the vehicle 20 includes two rows of seats 50 that face each other, with the front row 52 being rearward-facing and the rear row 54 being forward-facing. More or fewer rows of seats facing in either direction are also contemplated.

For the unconventional, forward-rearward seating arrangement, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Regardless of the seating arrangement, each seat 50 includes a base or bottom 53 for receiving the lower legs/lap/knees 66 of the occupant 60. A seatback 55 extends from the base 53 towards the roof 32 and receives the upper torso 64 of the occupant 60. A headrest 57 is connected to the seatback 55 and receives the head 62 of the occupant 60.

In either seating arrangement, since the front row 52 need not face forward and/or need not be in close proximity to the instrument panel 42 or the area where an instrument panel would normally reside, there can be a large volume of space between the front row and the forward cabin structure presented facing the front row. That said, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

To account for these challenges, the occupant restraint system 10 includes at least one vehicle occupant protection device in the form of an inflatable airbag 70 housed/concealed in the floor 72 of the vehicle 20. More particularly, in the example configuration of FIGS. 2 and 3, the airbags 70 are mounted on or near the floor 72 in or in the area of the instrument panel 42 of the foot well for the front seat 50 occupant 60 and on or near the floor for the rear seat 50 occupant.

Mounting the airbags 70 in the area of the floor 72 allows for rapid deployment into a position extending laterally across the width (the lateral direction of the vehicle 20) of the seat 50 in front of the occupant 60. The airbags 70 can be configured to deploy from their mounting locations inboard and/or outboard, depending on factors such as the architecture of the vehicle 20 and the resulting space through which the airbags can deploy. In any case, mounting the airbags 70 in the area of the floor 72 is also convenient because the airbags can be positioned in a location with a desired proximity to the occupant(s) 60 they are intended to help protect. This can help reduce the necessary inflatable volume of the airbags 70 and can also help provide a desired deployment time without requiring an excessively high-volume inflator.

The airbag 70 is stored in a module 68 having a housing 69. In the example configurations of FIGS. 2 and 3, the airbag modules 68 are mounted on (i.e., above the floor 72). This is just one example of how the mounting can be accomplished. The airbag modules 68 could, however, be mounted on the floor 72 so that the upper extend of the housing 69 is flush with or recessed within the floor surface so as to be hidden and not intrude upon occupant 60 movement in the cabin 40. Of course, each mounting location brings different challenges in terms of configuring the airbag module 68. These challenges and their respective solutions will become apparent in the paragraphs that follow.

The airbag 70 is at least one of rolled and folded before being placed in the housing 69 of the module 68. The module 68 is then placed within the floor 72. The occupant restraint system 10 also includes an inflator 74 positioned in each module 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided in the floor 72 adjacent each seat 50 in each row 52, 54. In other words, each seat 50 in the vehicle 20 can have an individual module 68 (with corresponding airbag 70 and inflator 74) associated therewith. Alternatively, a single module 68 and, thus, a single airbag 70 and inflator 74 can be associated with an entire row 52 or 54 of seats 50.

Regardless, in FIG. 2, each airbag 70 is positioned in the floor 72 in front of the associated seat 50 (i.e., forward of the seats 50 in the front row 52 and forward of the seats in the rear row 54). In FIG. 3, the airbags 70a and 70 are positioned rearward of the seats 50 in the front row 52 and forward of the seats in the rear row 54, respectively. Although the airbags within the floor 72 are identical for each row provided in the vehicle 20, the construction and operation of only the airbag associated with a seat 50 in the rear row 54 is discussed for brevity for the seating arrangement shown in FIG. 2.

As shown in FIG. 2, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the housing 69, which causes both the housing and the floor 72 to open (e.g., via tear seam or door). This releases the airbag 70 to inflate and deploy from stored condition in the module 68 on the floor 72 to a deployed condition extending into the cabin 40 forward of and aligned (e.g., in the forward-rearward direction of the vehicle 20) with the seat 50 in the rear row 54. In particular, the airbag 70 inflates in the lateral direction of the vehicle 20 across the width of the seat 50 so as to be aligned with the occupant 60 in the seat. The airbag 70, while inflated, helps protect the vehicle occupant 60 in the rear row 54 by absorbing the impact of the occupant.

Figure 4:
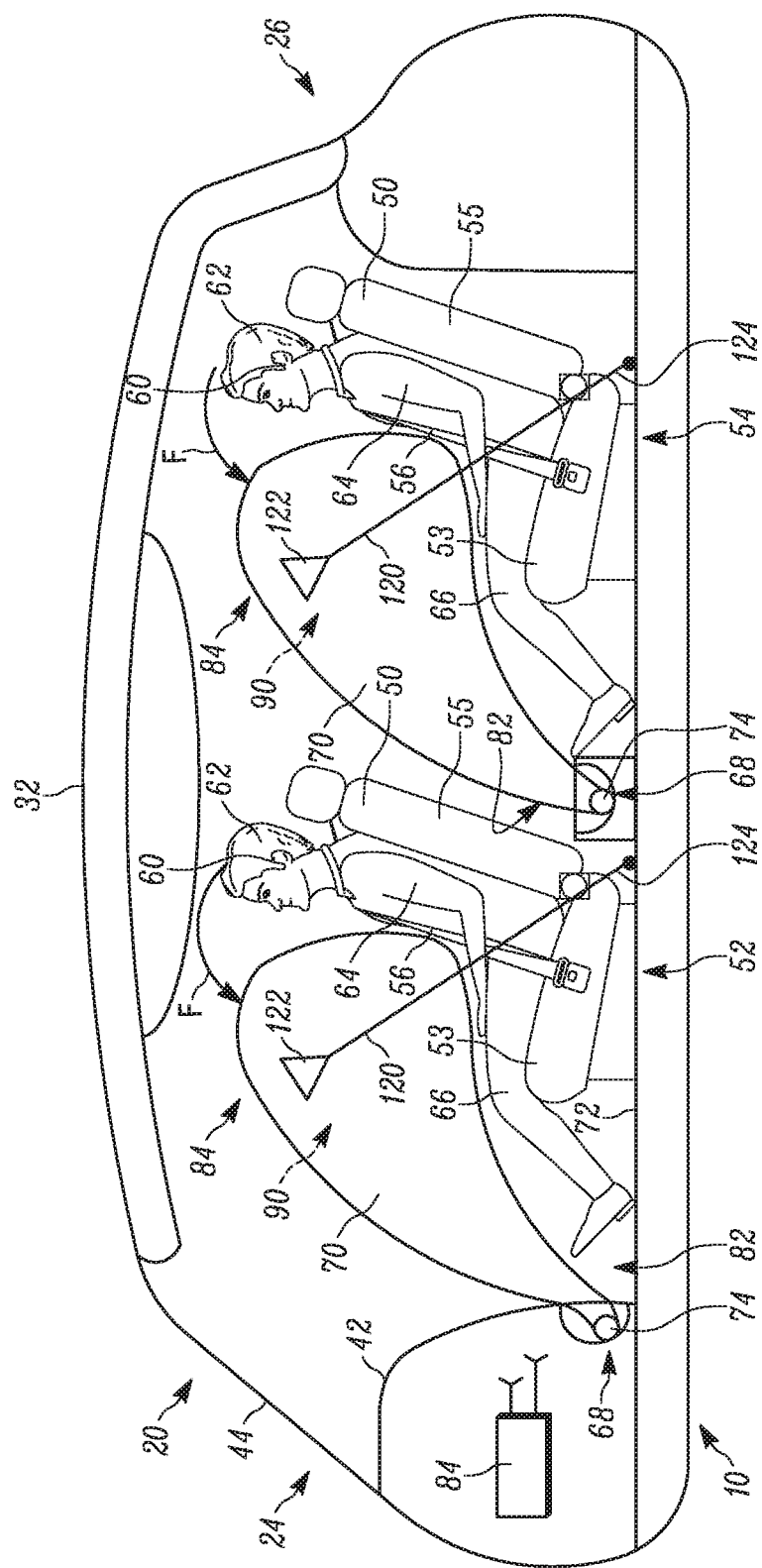
FIG. 4 is a schematic illustration of the cabin of the vehicle of FIG. 2 with the airbags in a deployed condition.

As shown in FIG. 4, the airbag 70 inflates from its stored locations in the floor 72 to its deployed condition. The airbag 70, when deployed, extends from a lower end 82 to an upper end 84 and defines an inflatable volume 90. The lower end 82 is connected to the vehicle 20 and fluidly connected to the inflator 74. The upper end 84 is positioned adjacent to the occupant 60 in the rear row 54.

In its deployed condition, the airbag 70 is configured to extend across the width of the seat 50 in front of the occupant 60 and upward from the floor 72 to a position sufficient to receive and help protect the occupant's head 62 and upper torso 64. The lower end 82 of the airbag 70 can also be configured to cover the occupant's knees and the upper portion of the lower legs 66. In one example, the lower end 82 extends rearward and upward away from the floor 72 generally towards the occupant's upper torso 64. In any case, the airbag 70 can inhibit the lower legs 66 from extending and help prevent injuries, such as hyperextension.

The extent of the airbag 70 deployment vertically and/or horizontally (as shown in FIG. 4) can be adjusted in order to adjust the coverage of the airbags. To this end, the airbag 70 can be configured to extend further inboard and/or outboard in order to help protect the occupant 60 in the event of an oblique or offset collision. The inflated depth of the airbag 70 (in the direction of the centerline 22) can also be adjusted.

As noted, there is no vehicle structure in position to act as a reaction surface to constrain movement of the deployed airbag 70. That said, tethers 120 support the airbag 70 against movement in response to occupant penetration. More specifically, the tethers 120 replace the reaction surface typically required for frontal passenger airbags. To this end, a pair of tethers 120 can be provided for the airbag 70 on the inboard and outboard sides thereof on opposite sides of the seat 50 and therefore on opposite sides of the occupant 60.

The tethers 120 extend from first ends 122 connected to the inboard and outboard sides, respectively, of the airbag 70. The second ends 124 are connected to the floor 72 laterally and rearward (behind) of the associated seat 50 and occupant 60. The second ends 124 could have fastening locations other than the illustrated floor 72 locations. For example, the second ends 124 could be located in the vehicle seats 50 (e.g., in the seat base 53 or seatback 55 (not shown)). The first end 122 can constitute or include a stress reducer for spreading the connection between the tethers 120 and the airbags 70 over a large surface of the airbag fabric so as to prevent tearing.

Because the occupant 60 is belted, a frontal crash resulting in forward occupant movement causes the occupant to bend at the waist and follow an angled or arcuate path toward the airbag 70, as indicated generally by the arrow F in FIG. 4. As shown in FIG. 4, for example, the tethers 120 can extend substantially perpendicular to the seatback 55. Once the moving occupant 60 engages the airbag 70, the airbag is urged to move in the direction F. The tethers 120, being connected to the floor 72 and the sides of the airbag 70, help prevent the airbag from moving in the direction F.

Advantageously, as shown in FIG. 4, the locations of the second end 124/floor 72 connections can be selected such that the tension the tethers 120 apply to the airbag 70 can be opposite the impact forces applied to the airbag by the penetrating occupant 60. For example, the tethers 120 can pull the airbag 70 rearward in the vehicle 20 while the penetrating occupant 60 attempts to push the airbag forward in the vehicle. As a result, the floor 72, through the tethers 120, acts as the reaction surface for the airbag 70. The airbag 70 therefore provides a ride-down effect on the moving occupant 60 to thereby help reduce loads thereon. To this end, the airbag 70 accommodates the moving occupant 60 by providing a more gradual reaction force in response to occupant penetration. The example configuration of FIGS. 1-4 therefore requires no interaction with forward structure of the vehicle 20, such as an instrument panel, steering wheel, or seat, to provide a reaction surface for the airbag 70.

Figure 5:
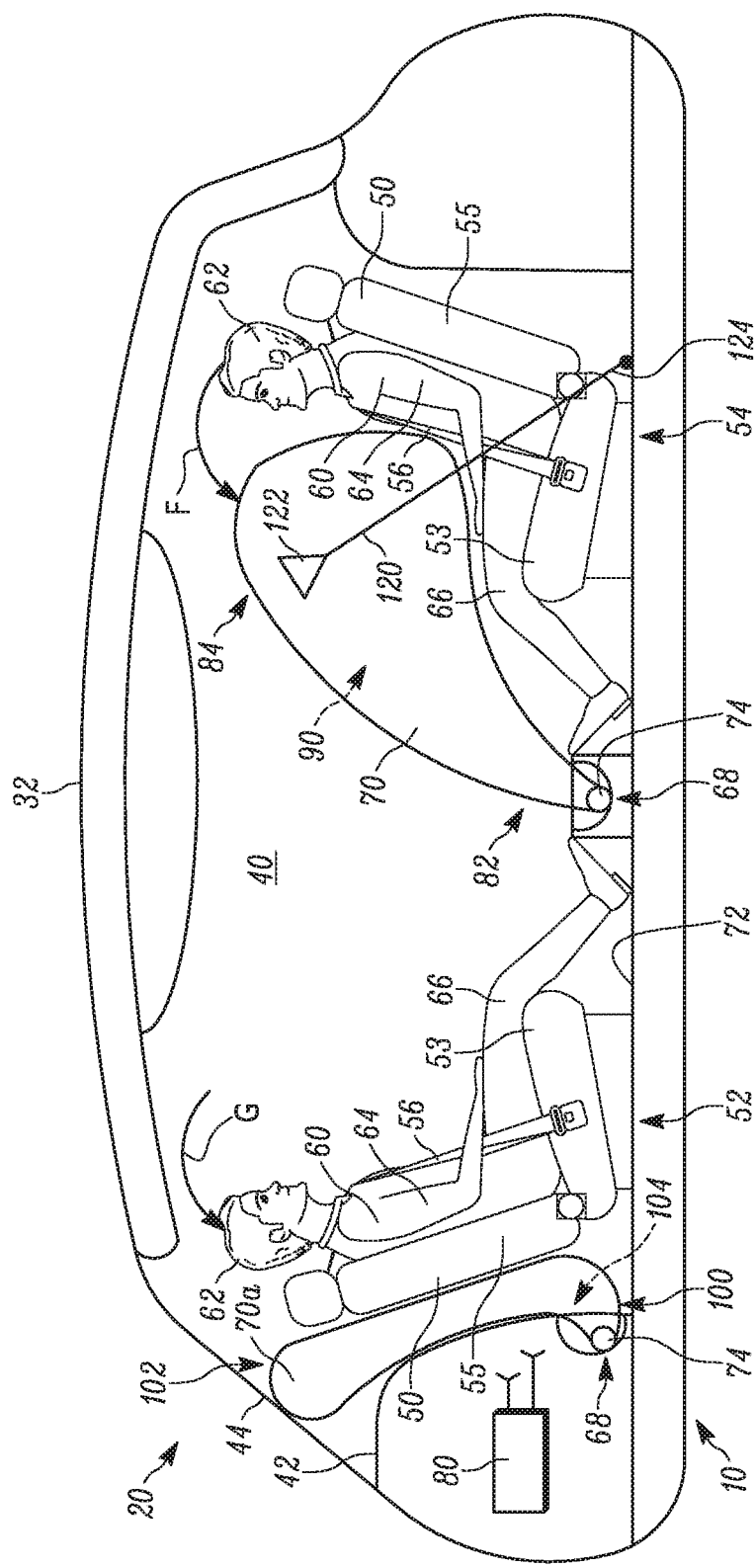
FIG. 5 is a schematic illustration of the cabin of the vehicle of FIG. 3 with the airbags in a deployed condition.

In the unconventional seating arrangement shown in FIG. 5, the airbag (indicated at 70a for clarity) associated with the seat 50 in the front row 52 deploys between the instrument panel 42 and the seatback 55. More specifically, the airbag 70a inflates from its stored condition in the instrument panel 42 on the floor 72 to its deployed condition aligned with the occupant 60 in the seat 50. The deployment can be in the lateral direction of the vehicle 20. The airbag 70a, when deployed, extends from a lower end 100 to an upper end 102 and defines an inflatable volume 104. The lower end 100 is connected to the vehicle 20 and fluidly connected to the inflator 74. The upper end 102 is positioned behind the occupant 60 between the windshield 44 and seatback 55. In one example, the airbag 70a, when deployed, substantially occupies the space between the instrument panel 42 and the seatback 55 and is wedged therebetween. The tethers 120 can be omitted (as shown) or provided (not shown) in this configuration.

Because the occupant 60 is belted, a frontal crash resulting in forward occupant movement causes the occupant to lean backwards at the waist and follow an angled or arcuate path into the seatback 55 and toward the airbag 70, as indicated generally by the arrow G in FIG. 5. The amount of force exerted by the moving occupant 60 on the seatback 55 can be sufficient to cause the seatback to likewise move in the direction G.

Advantageously, the position of the airbag 70a in FIG. 5 helps to restrict movement of the seat in the direction G. In this manner, the pressurized airbag 70a—being wedged between the seatback 55 and the instrument panel 42—limits or prevents movement of the seatback towards the instrument panel in the direction G. The airbag 70a therefore provides a ride-down effect on the moving occupant 60 to thereby help reduce loads thereon. To this end, the airbag 70a accommodates the moving occupant 60 by providing a more gradual reaction force to movement of the seatback 55 in the direction G in response to occupant movement.

Figure 6:
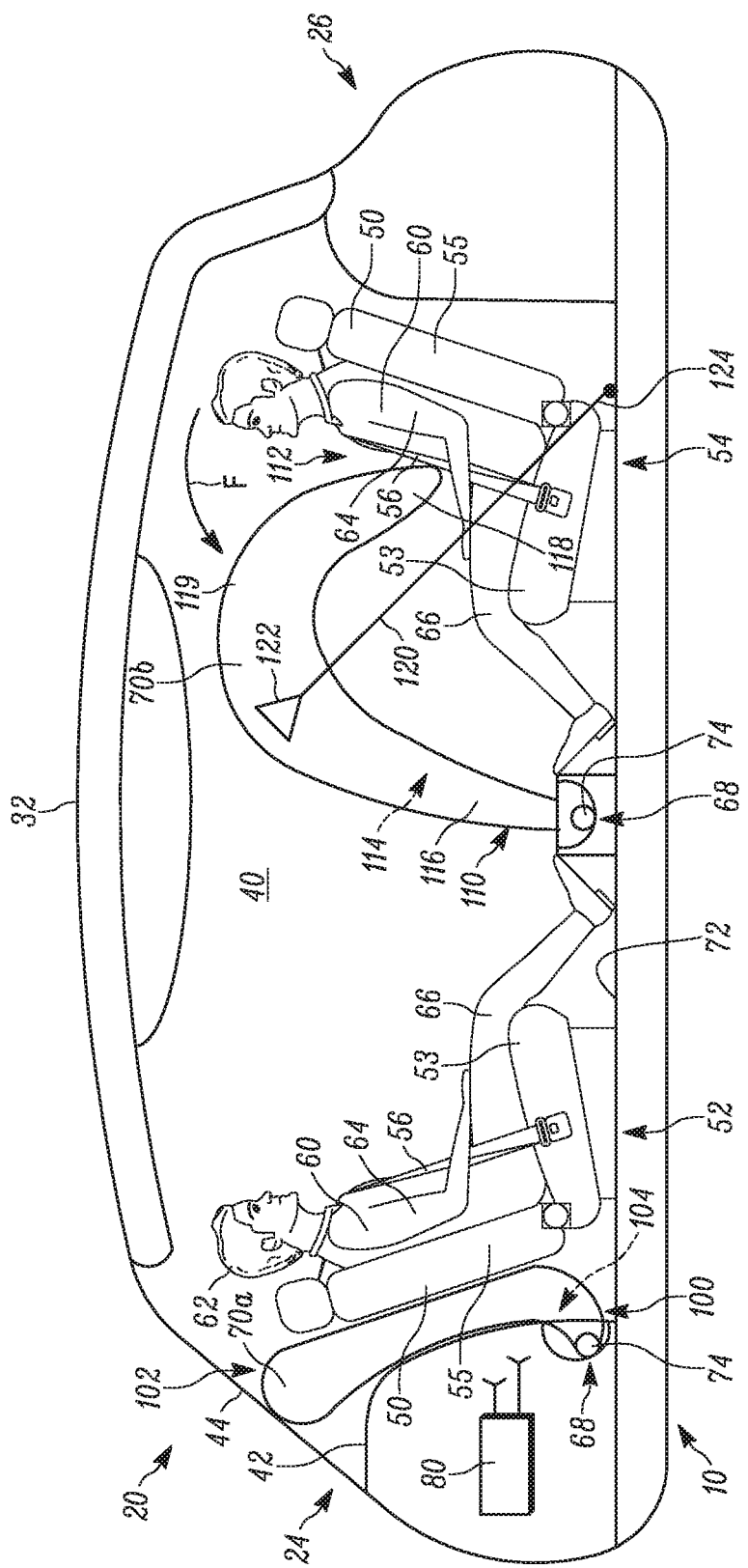
FIG. 6 is a schematic illustration of the cabin of the vehicle of FIG. 3 with another example airbag in a deployed condition.

As another example configuration shown in FIG. 6, the airbag 70b can have a configuration suited to provide better performance in terms, for example of inflation fluid volume. In FIG. 6, the airbag 70b has a curved configuration that reduces its volume without reducing coverage and impact absorbing performance. The airbag 70b, when deployed, has a hook or upside-down U-shaped configuration. As with the airbags 70 and 70a, the airbag 70b inflates in the lateral direction of the vehicle 20 across the width of the seat 50 so as to be aligned in the forward-rearward direction of the vehicle 20 with the occupant 60 in the seat 50.

The airbag 70b extends from a lower end 110 to an upper end 112 and defines an inflatable volume 114. The airbag 70b includes a pair of spaced-apart legs 116, 118 connected by an upper portion 119. The leg 116 is connected to the airbag module 68 and receives inflation fluid from the inflator 74. The leg 118 forms a free end of the airbag 70b and terminates adjacent the upper torso 64 of the occupant 60.

The hook-shaped airbag 70b has a smaller inflatable volume 114 than a single chamber construction having the same outer, peripheral footprint while using more airbag fabric to define the inflatable volume. Since the legs 116, 118 of the hook-shaped airbag 70b have comparatively small thicknesses, they have a high surface area to volume ratio. This renders the legs 116, 118 relatively and comparatively stiff when inflated.

The tethers 120 are provided on the inboard and outboard sides of the airbag 70b. The first ends 122 of the tethers 120 are connected to the upper portion 119. The second ends 124 of the tethers 120 are connected to the floor 72 of the vehicle 20.

Due to this construction, the leg 118, in response to occupant 60 penetration into the airbag 70b, is inclined to move in the manner F. This can include the leg 118 bending or folding relative to the upper portion 119 towards the other leg 116. Advantageously, as shown in FIG. 6, the locations of the second end 124/floor 72 connections can be selected such that the tension the tethers 120 apply to the airbag 70b can be opposite the impact forces applied to the airbag by the penetrating occupant 60.

For example, the tethers 120 can pull the airbag 70b rearward in the vehicle 20 while the penetrating occupant 60 attempts to push the airbag (more specifically the leg 118) forward in the vehicle. As a result, the floor 72, through the tethers 120, acts as the reaction surface for the airbag 70b by substantially holding the leg 116 and upper portion 119 in place while allowing the leg 118 to move relative thereto. In one example, moving the leg 118 in the direction F can cause the upper portion 119 to deform and engage the roof 32 (not shown), thereby providing an additional reaction surface for the airbag 70b.

In any case, the airbag 70b therefore provides a ride-down effect on the moving occupant 60 to thereby help reduce loads thereon. To this end, the airbag 70b accommodates the moving occupant 60 by providing a more gradual reaction force in response to occupant penetration. The example configuration of FIG. 6 therefore requires no interaction with forward structure of the vehicle 20, such as an instrument panel, steering wheel, or seat, to provide a reaction surface for the airbag 70b.

The airbags 70-70b of FIGS. 1-6 can include the tethers 120 while at the same time having a variety of configurations. For example, the airbags 70-70b can include internal tethers (not shown) for helping to shape or otherwise control their inflated configurations. Such tethers could, for example, create pockets or areas of reduced surface tension for improving occupant protection, such as by providing an enhanced degree of cushioning for the occupant's upper torso and/or head.

Figure 7:
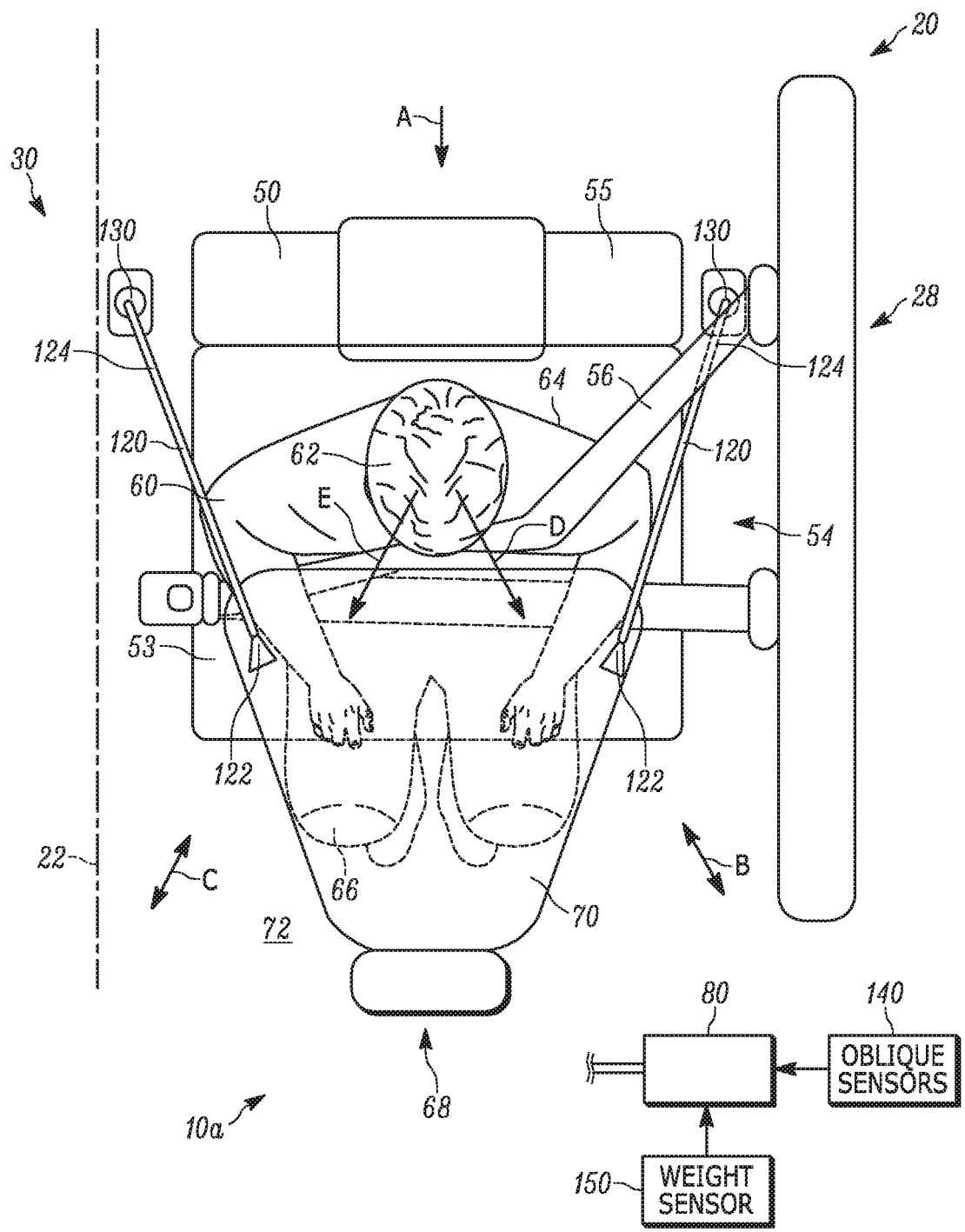
FIG. 7 is a top view of the restraint system of FIG. 4.
Figure 8A:
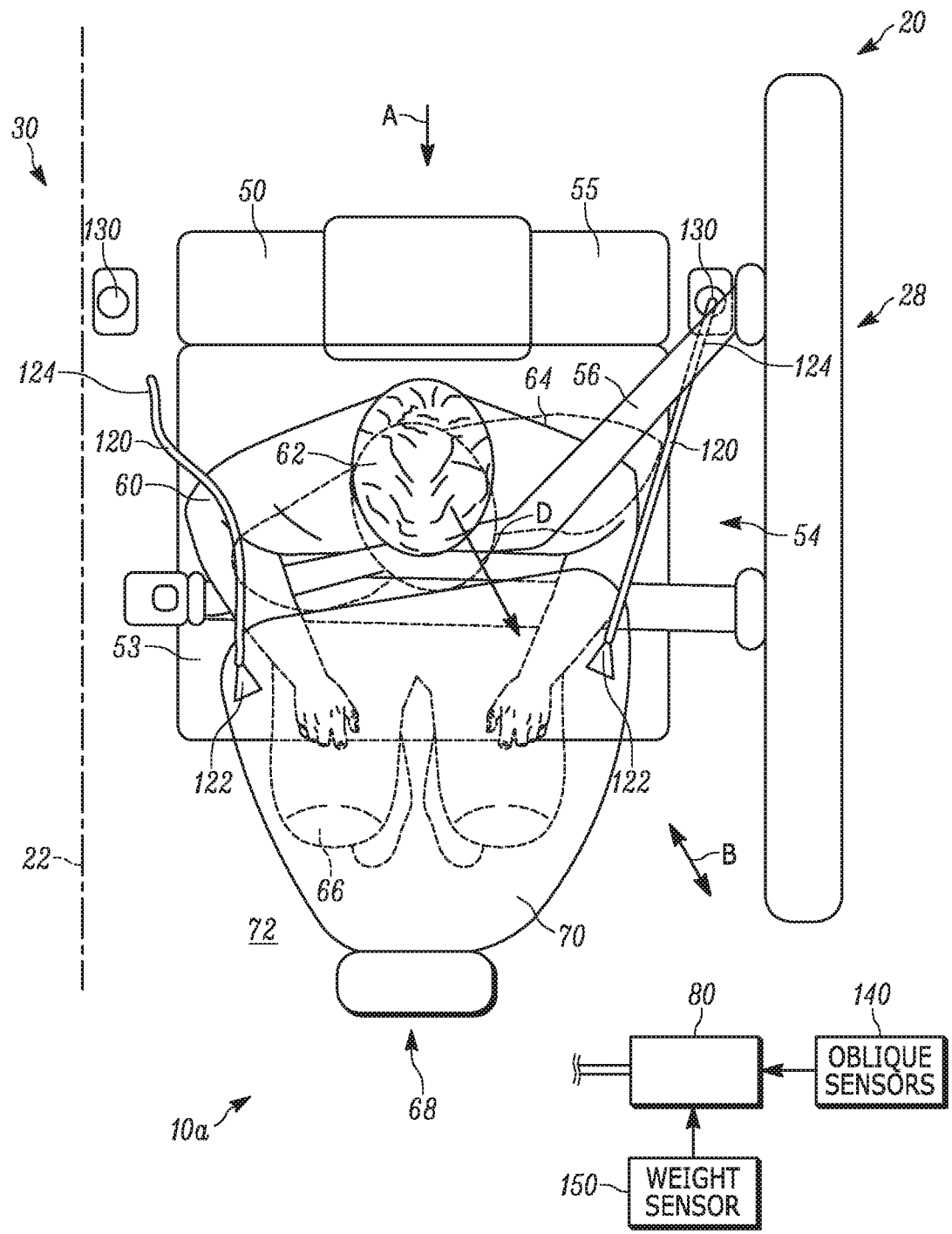
FIG. 8A is a top view of the restraint system of FIG. 4 in a left oblique crash.
Figure 8B:
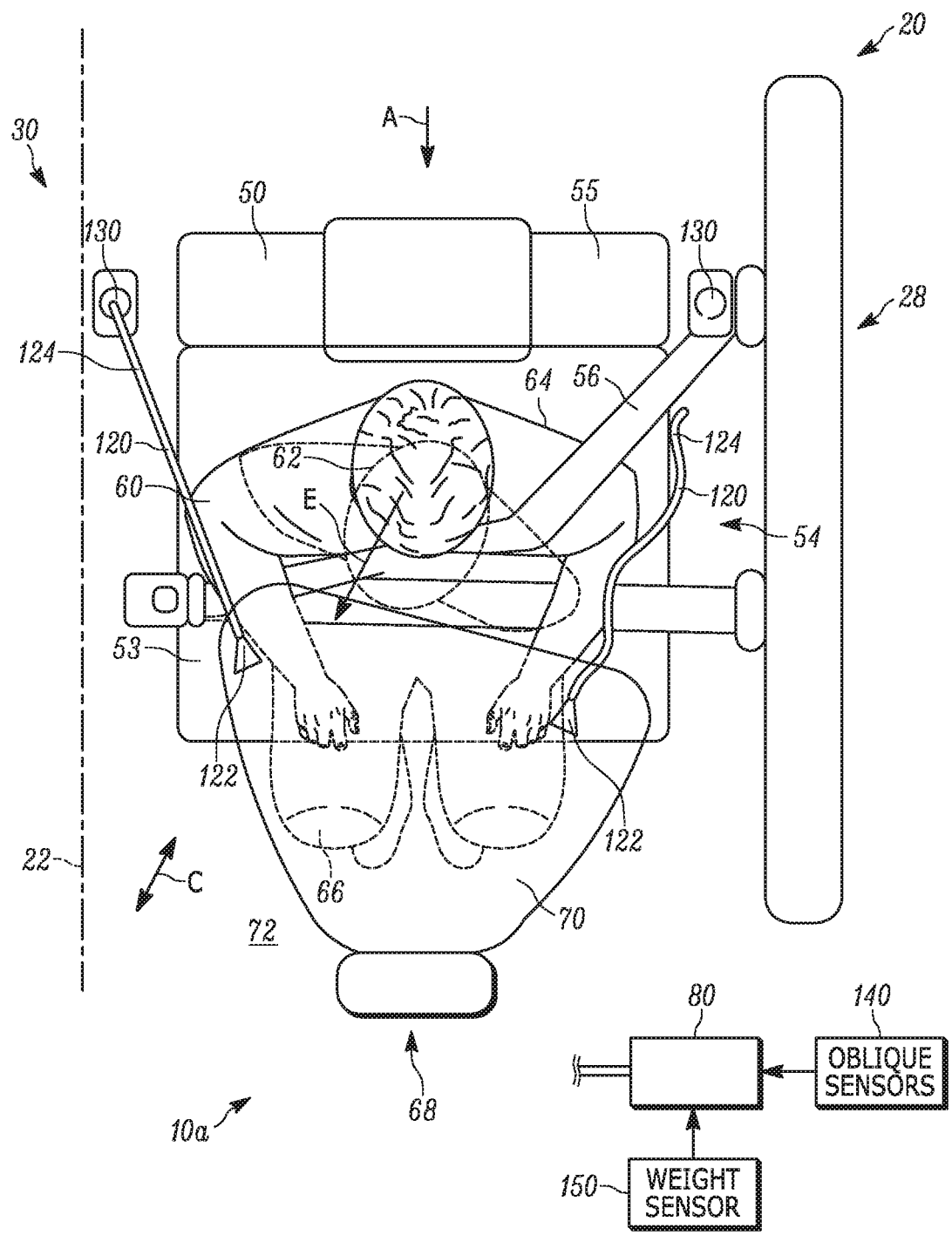
FIG. 8B is a top view of the restraint system of FIG. 4 in a right oblique crash.

FIGS. 7-8B illustrate another example configuration of the occupant restraint system 10a. In FIGS. 7-8B, the airbag module 68 includes the airbag 70, tethers 120, and a tether actuation unit 130 associated with each tether. It will be appreciated that the airbag 70b could also be used (not shown). The first end 122 of each tether 120 is secured to one of the lateral sides of the airbag 70. The second ends 124 of each tether 120 are secured to the tether actuation units 130, which are actuatable to control operation of the tethers.

The tether actuation units 130 can, for example, be actuatable fasteners that connect the second ends 124 of the tethers 120 to the floor 72. The tether actuation units 130 are actuatable to release the tether 120 connection to the floor 72 in response to sensed vehicle and/or occupant 60 conditions at the time of the accident. For example, the tether actuation units 130 can be actuated in response to detecting the occurrence of an oblique or offset vehicle condition. Alternatively, the tether actuation units 130 can be configured to control the lengths of the tethers 120 by spooling/unspooling one or both tethers in response to detecting the occurrence of an oblique or offset vehicle condition. In either case, the tether actuation units 130 are provided on the floor 72 on the left and right sides of each seat 50.

As another example, the tether actuation units 130 can be actuated in response to a sensed position of the occupant 60. These sensed occupant positions can, for instance, be an out of position occupant 60 (i.e., leaned forward or to the side) or reclined. In any case, operating the tethers 120 can allow the airbags 70 to achieve a position better suited to protect the occupants 60, given the sensed vehicle and/or occupant conditions.

Referring to FIG. 7, an oblique impact is meant to refer to scenarios where the impact results in the occupant 60 moving obliquely forward in the vehicle 20 in a direction that is non-parallel to the vehicle centerline 22 and the direction of forward vehicle travel (see arrow A). For example, a left oblique impact can occur on the left side 28 of the vehicle 20 in response to, for example, the vehicle skidding at an angle into another vehicle or barrier, or in response to being struck by another vehicle moving at an angle. The left oblique impact is illustrated generally by the double arrow labeled B. Similarly, a right oblique impact can occur on the right side 30 of the vehicle 20 in response to, for example, the vehicle skidding at an angle into another vehicle or barrier, or in response to being struck by another vehicle moving at an angle. The right oblique impact is illustrated generally by the double arrow labeled C in FIG. 7.

In the event of an oblique impact, the occupant 60 moves forward in the vehicle 20 in a direction that is angled either inboard of the vehicle (i.e., toward the vehicle centerline 22 or right side 30) or outboard of the vehicle (i.e., toward the left side 28). In the event of a left oblique impact B (FIG. 8A), the occupant 60 moves forward-outboard (in the direction D toward the position indicated generally in dashed lines). Conversely, in the event of a right oblique impact C (FIG. 8B), the occupant 60 moves forward-inboard in the direction E toward the position indicated generally in dashed lines).

Of course, the oblique direction in which the occupant 60 moves, and their resulting position, can vary depending on the particulars of the impact event, such as the angle and/or velocity at which the vehicle 20 impacts another vehicle or object. Therefore, the oblique outboard and inboard directions of occupant 60 movement indicated by the respective arrows D and E, and the resulting respective position of the occupant, is by way of example only.

The degree to which the airbag 70 can help protect the occupant 60 in an oblique impact depends on the degree to which the occupant movement deviates from the forward direction (i.e., the angle between arrows A and D or between arrows A and E). As the degree to which the occupant 60 movement deviates from the forward direction (i.e., as the angle increases) the ability of the airbag 70 to help protect the occupant 60 when deploying in the manner shown in FIGS. 1-6 also decreases. Thus, as the occupants' movements become increasingly oblique, the ability of the airbag 70 shown in FIGS. 1-6 to help protect the occupant 60 decreases.

Accordingly, in the event of a left oblique impact B it may be desirable for the tether actuation unit 130 on the inboard side of the seat 50 to release so that the airbag 70 can shift or rotate outboard to help receive and better protect the occupant 60 moving in the direction D. Similarly, in the event of a right oblique impact C it may be desirable for the tether actuation unit 130 on the outboard side of the seat 50 to release so that the airbag 70 can shift inboard to help receive and better protect the occupant 60 moving the in the direction E.

To this end, the occupant restraint system 10*a* can include at least one oblique crash sensor 140 connected to the controller 80 for determining when actuation of one or more of the tether actuations units 130 is appropriate. The oblique crash sensors 140 can be located on the left and right sides 28, 30 of the vehicle 20 (e.g., on the front bumper, front quarter panels, and/or side view mirrors).

When one or more oblique crash sensors 140 indicate the left oblique impact B of FIG. 8A, the controller 80 actuates the tether actuation unit 130 associated with the inboard tether 120, which releases (or unspools) the second end 124 of the inboard tether. As a result, the inboard tether 120 no longer restrains movement of the airbag 70 away from the seat 50. Consequently, forward-outboard occupant movement D causes the airbag 70 to shift or rotate about the first end 122 of the outboard tether 120 and/or about the lower end 82/module 68 connection in the counterclockwise direction (as shown in FIG. 8A). Since the lower end 82 of the airbag 70 remains connected to the module 68 and the outboard tether 120 remains connected to the airbag, the occupant is able to move with the shifting airbag in a controlled manner.

On the other hand, when one or more oblique crash sensors 140 indicate the right oblique impact C of FIG. 8B, the controller 80 actuates the tether actuation unit 130 associated with the outboard tether 120, which releases (or unspools) the second end 124 of the outboard tether. As a result, the outboard tether 120 no longer restrains movement of the airbag 70 away from the seat 50. Consequently, forward-inboard occupant movement E causes the airbag 70 to shift or rotate about the first end 122 of the outboard tether 120 in the clockwise direction (as shown in FIG. 8B).

Since the lower end 82 of the airbag 70 remains connected to the module 68 and the inboard tether 120 remains connected to the airbag, the occupant is able to move with the shifting airbag in a controlled manner. In both oblique impacts B, C, the shifting airbag 70 provides a ride-down effect on the penetrating occupant 60 by gradually dissipating the impact force on the occupant by the airbag. Advantageously, the shifting airbag 70 more closely aligns with the forward-outboard D or forward-inboard E movement of the occupant 60.

Alternatively or additionally, the tether actuation units 130 can be actuated in response to a sensed position of the occupant 60. The sensed occupant 60 position can, for instance, be an out of position occupant (i.e., leaned forward or to the side) or reclined. The position of the occupant 60 can be monitored by one or more weight sensors 150 connected to the seat 50 (e.g., in the base 53 or seatback 55). One or more cameras (not shown) can also be provided in the cabin 40 and have a field of view that includes the occupant 60 in the seat 50.

The controller 80 is connected to the weight sensors 150 (and the cameras when present) and receives signals from the weight sensors indicative of the position of the occupant 60. The controller 80 can then rely on the signals from the weight sensors 150 to determine when the occupant 60 is out of position and therefore likely to move in the inboard or outboard direction in response to a vehicle 20 crash. Once the determination is made, the controller 80 can then determine whether to actuate either of the tether actuation units 130 to release one of the tethers 120 and allow the airbag 70 to shift inboard or outboard accordingly.

Although the impacts and occupant 60 movement shown and described refer to an occupant in a seat 50 on the left side 28 of the vehicle 20 it will be appreciated that the controller 80 and tether actuations units 130 can also account for movement of occupants on the right side 30 of the vehicle 20 (not shown). More specifically, a left oblique impact B causes the occupant 60 on the right side 30 to move in the forward-inboard direction. When this occurs, the outboard tether actuation unit 130 associated with the seat 50 on the right side 30 is actuated to release (or unspool) the outboard tether 120. On the other hand, a right oblique impact C causes the occupant 60 on the right side 30 to move in the forward-outboard direction. When this occurs, the inboard tether actuation unit 130 associated with the seat 50 on the right side 30 is actuated to release (or unspool) the inboard tether 120.

From the above, it will be appreciated that the example configurations of FIGS. 1-8B illustrate that the airbags 70-70*c* are configured to utilize the vehicle floor 72 as a reaction surface regardless of whether the seats are in the conventional seating arrangement (FIG. 2) or the unconventional seating arrangement (FIG. 3). By "reaction surface," it is meant that it is the vehicle floor 72 that support their respective airbags against movement in response to an impacting occupant(s) 60. This allows the airbags to absorb impact forces of the occupants 60 and provide the desired ride-down effect. Advantageously, the example configurations can rely only the vehicle floor 72 to provide the reaction surface and can provide effective occupant protection without requiring any support from structure other than the seats. The vehicle floor 72 can thereby support the airbag modules 68 and the airbags 70 entirely.

Additionally, mounting each of the airbag modules in the vehicle floor 72 allows the airbags to be tasked with protecting only a certain occupant or occupants. For example, the airbag modules can be mounted to protect occupants on a seat-by-seat basis. This also allows for versatility in seating configurations, as the modules can be mounted relative to virtually any seating location and orientation.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. To this end, it will also be appreciated that features shown and illustrated in any one example can likewise be added to/interchanged with features in any other example.

We claim:

1. A restraint system for helping to protect an occupant of a vehicle having a floor and a cabin with a seat for the occupant, comprising:

an airbag having a stored condition on the vehicle floor and being inflatable to a deployed condition aligned with the occupant in a forward-rearward direction of the vehicle, wherein the airbag when in the deployed condition is configured to extend above a seat base in front of a seatback to a position configured to receive a head and torso of the occupant and to utilize the vehicle floor as a reaction surface for restraining movement of the airbag in response to occupant penetration into the airbag; and at least one tether having a first end connected to the airbag at a location on the airbag positioned above the seat base when the airbag is in the deployed condition and a second end connected to the vehicle floor, the at least one tether being configured to transmit energy of an occupant penetrating the airbag to the vehicle floor.

2. The restraint system recited in claim 1, wherein the airbag is inflatable in a lateral direction of the vehicle to a position in front of the occupant.

3. The restraint system recited in claim 1, wherein the airbag includes a first leg connected to the floor, a second leg configured to face the occupant, and a portion connecting the first and second legs such that the airbag is hook-shaped.

4. The restraint system recited in claim 1, further comprising an airbag module comprising a housing configured to be mounted on the vehicle floor and an inflator for providing inflation fluid for inflating the airbag.

5. The restraint system recited in claim 1, further comprising:
   a sensor for sensing an occurrence of an event for which deployment of the airbag is desired and producing a signal indicative thereof; and
   a controller configured to receive the signal from the sensor and, in response to receiving the signal from the sensor, to actuate an inflator to inflate the airbag to the deployed condition.

6. A restraint system for helping to protect an occupant of a vehicle having a floor and a cabin with a seat for the occupant, comprising:
   an airbag having a stored condition on the vehicle floor and being inflatable to a deployed condition aligned with the occupant in a forward-rearward direction of the vehicle, wherein the airbag when in the deployed condition is configured to extend above a seat base in front of a seatback to a position configured to receive a head and torso of the occupant and to utilize the vehicle floor as a reaction surface for restraining movement of the airbag in response to occupant penetration into the airbag, wherein the airbag is configured to be positioned in an instrument panel of the vehicle when in the stored condition.

7. The restraint system recited in claim 6, wherein the airbag is configured to be positioned between the instrument panel and the seat when in the deployed condition.

8. A restraint system for helping to protect an occupant of a vehicle having a floor and a cabin with a seat for the occupant, comprising:
   an airbag having a stored condition on the vehicle floor and being inflatable to a deployed condition aligned with the occupant in a forward-rearward direction of the vehicle, wherein the airbag when in the deployed condition is configured to extend above a seat base in front of a seatback to a position configured to receive a head and torso of the occupant and to utilize the vehicle floor as a reaction surface for restraining movement of the airbag in response to occupant penetration into the airbag; and
   first and second tethers positioned on opposite lateral sides of the seat, wherein each tether has a first end connected to the airbag at a location on the airbag positioned above the seat base when the airbag is in the deployed condition and a second end connected to the vehicle floor, the first and second tethers being configured to transmit energy of an occupant penetrating the airbag to the vehicle floor.

9. The restraint system recited in claim 8, further comprising first and second tether actuation units that connect the second ends of the first and second tethers, respectively, to the vehicle floor, wherein the tether actuation units are individually actuatable and are configured for actuation in response to detection of an oblique vehicle crash to release one of the first and second tethers to allow the airbag to shift in response to oblique occupant movement and penetration resulting from the oblique vehicle crash.

10. The restraint system recited in claim 9, wherein the first actuation unit and the first tether are positioned on a right side of the seat and wherein the first actuation unit is configured to release the first tether in response to a left-side oblique vehicle crash.

11. The restraint system recited in claim 9, wherein the second actuation unit and the second tether are positioned on a left side of the seat and wherein the second actuation unit is configured to release the second tether in response to a right-side oblique vehicle crash.

12. The restraint system recited in claim 9, further comprising:
   an oblique crash sensor configured to provide a signal indicative of an oblique vehicle crash; and
   a controller configured to receive the signal from the oblique crash sensor and to actuate one of the first and second tether actuation units in response receiving the signal indicative of an oblique vehicle crash to release an associated one of the first and second tethers.

13. The restraint system recited in claim 8, further comprising first and second tether actuation units that connect second ends of the first and second tethers, respectively, to the vehicle floor, wherein the system is configured to actuate one of the first and second tether actuation units in response to detecting that the occupant is out of position to release an associated one of the first and second tethers and allow the airbag to shift in response to penetration of the out of position occupant.

14. The restraint system recited in claim 13, further comprising
   at least one weight sensor configured to provide a signal indicative of a position of the occupant on the seat; and
   a controller configured to receive the signal from the at least one weight sensor and actuate the one of the first and second tether actuation units.

15. A restraint system for helping to protect an occupant of a vehicle having a floor and a cabin with a seat for the occupant, comprising:
   an airbag having a stored condition on the vehicle floor and being inflatable in a lateral direction of the vehicle to a deployed condition in front of the occupant; and
   first and second tethers each having a first end connected to the airbag and a second end connected to the vehicle floor at a location configured to be behind the occupant when seated on the seat, the first and second tethers being configured to transmit energy of occupant penetration into the airbag to the vehicle floor such that the airbag utilizes the vehicle floor as a reaction surface for restraining the movement of the airbag in response to the occupant penetration.

16. The restraint system recited in claim 15, further comprising first and second tether actuation units that connect the second ends of the first and second tethers, respectively, to the vehicle floor, wherein the tether actuation units are actuatable individually in response to detecting an oblique vehicle crash to release the associated one of the first and second tethers, which allows the airbag to shift laterally in response to occupant penetration.

17. The restraint system recited in claim 16, wherein the first actuation unit and the first tether are positioned on a right side of the seat and the second actuation unit and the second tether are positioned on a left side of the seat, wherein the first actuation unit when actuated releases the first tether in response to a left-side oblique vehicle crash and wherein the second actuation when actuated releases the second tether in response to a right-side oblique vehicle crash.

18. The restraint system recited in claim 17, further comprising:
  an oblique crash sensor configured to provide a signal indicative of an oblique vehicle crash; and
  a controller configured to receive the signal from the oblique crash sensor and to actuate one of the first and second tether actuation units in response receiving the signal indicative of an oblique vehicle crash to release an associated one of the first and second tethers.

19. The restraint system recited in claim 15, further comprising first and second tether actuation units that connect second ends of the first and second tethers, respectively, to the vehicle floor, wherein the system is configured to actuate one of the first and second tether actuation units in response to detecting that the occupant is out of position to release an associated one of the first and second tethers and allow the airbag to shift in response to penetration of the out of position occupant.

20. The restraint system recited in claim 19, further comprising
  at least one weight sensor configured to provide a signal indicative of a position of the occupant on the seat; and
  a controller configured to receive the signal from the at least one weight sensor and actuate the one of the first and second tether actuation units.

21. The restraint system recited in claim 15, wherein the airbag is configured to extend above a seat base and in front of a seatback of the vehicle seat, the airbag when in the deployed condition being configured to receive a head and torso of the occupant.

\* \* \* \* \*